United States Patent
Barsness et al.

(10) Patent No.: US 8,645,338 B2
(45) Date of Patent: Feb. 4, 2014

(54) ACTIVE MEMORY EXPANSION AND RDBMS META DATA AND TOOLING

(75) Inventors: Eric L. Barsness, Pine Island, MN (US); Paul S. Nelsestuen, Oronoco, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 36 days.

(21) Appl. No.: 12/914,063

(22) Filed: Oct. 28, 2010

(65) Prior Publication Data

US 2012/0109908 A1    May 3, 2012

(51) Int. Cl.
*G06F 17/30* (2006.01)

(52) U.S. Cl.
USPC .......................................... 707/693; 707/722

(58) Field of Classification Search
USPC ..................... 707/722, 693–694; 711/147
See application file for complete search history.

(56) References Cited

U.S. PATENT DOCUMENTS

| | | | |
|---|---|---|---|
| 5,276,898 A | 1/1994 | Kiel et al. | |
| 5,675,789 A * | 10/1997 | Ishii et al. ............................. | 1/1 |
| 5,742,806 A | 4/1998 | Reiner et al. | |
| 5,794,229 A | 8/1998 | French et al. | |
| 5,893,102 A | 4/1999 | Maimone et al. | |
| 5,918,225 A | 6/1999 | White et al. | |
| 5,930,466 A | 7/1999 | Rademacher | |
| 5,946,692 A | 8/1999 | Faloutsos et al. | |
| 6,343,293 B1 | 1/2002 | Lyle | |
| 6,374,250 B2 | 4/2002 | Ajtai et al. | |
| 6,549,995 B1 | 4/2003 | Schulz et al. | |
| 6,577,254 B2 | 6/2003 | Rasmussen | |
| 6,658,549 B2 * | 12/2003 | Wilson et al. .................. | 711/202 |
| 6,691,132 B2 | 2/2004 | Walker et al. | |
| 6,766,334 B1 | 7/2004 | Kaler et al. | |
| 6,879,266 B1 * | 4/2005 | Dye et al. ......................... | 341/51 |
| 7,039,769 B2 * | 5/2006 | Castelli et al. ................ | 711/147 |
| 7,050,639 B1 | 5/2006 | Barnes et al. | |
| 7,058,783 B2 | 6/2006 | Chandrasekaran et al. | |
| 7,103,608 B1 | 9/2006 | Ozbutun et al. | |
| 7,127,449 B2 | 10/2006 | Barsness et al. | |
| 7,181,457 B2 | 2/2007 | Reinauer et al. | |
| 7,216,291 B2 | 5/2007 | Kim | |
| 7,475,090 B2 * | 1/2009 | Gheorghioiu et al. ................ | 1/1 |

(Continued)

FOREIGN PATENT DOCUMENTS

| | | |
|---|---|---|
| WO | 0021022 | 4/2000 |
| WO | 02093455 A2 | 11/2002 |
| WO | 2008009135 A2 | 1/2008 |
| WO | 03096230 A2 | 11/2013 |

OTHER PUBLICATIONS

Michel, Dirk, "Active Memory Expansion Performance", Sep. 2009, IBM Corporation, Somers, NY, USA.

(Continued)

*Primary Examiner* — Monica Pyo
(74) *Attorney, Agent, or Firm* — Patterson & Sheridan, LLP (57) ABSTRACT

Techniques are described for estimating and managing memory compression for query processing. Embodiments of the invention may generally include receiving a query to be executed, ascertaining indicatory data about the retrieved data, and selectively compressing a portion of the data in memory according to the indicatory data. In one embodiment, the amount of compression performed during each query execution is recorded and outputted to assist in adjusting the selective compression process.

14 Claims, 6 Drawing Sheets

(56) References Cited

U.S. PATENT DOCUMENTS

| | | |
|---|---|---|
| 7,480,643 B2 | 1/2009 | Barsness et al. |
| 2001/0054131 A1 | 12/2001 | Alvarez, II et al. |
| 2003/0028509 A1 | 2/2003 | Sah et al. |
| 2008/0162523 A1* | 7/2008 | Kraus et al. .................. 707/101 |
| 2009/0043734 A1* | 2/2009 | Barsness et al. .................. 707/3 |
| 2009/0043792 A1 | 2/2009 | Barsness et al. |

OTHER PUBLICATIONS

Jonathan Goldstein et al., "Compressing Relations and Indexes", Data Engineering, 1998. Proceedings, 14th International Conference, Feb. 23-27, 1998, pp. 370-379.

Poess, Meikel et ai, "Data Compression in Oracle", Proceedings of the 29th VLDB Conference, Berlin, Germany, 2003, pp. 937-947.

* cited by examiner

ACTIVE MEMORY EXPANSION AND RDBMS META DATA AND TOOLING

BACKGROUND

The present invention generally relates to database management, and more particularly, to managing data storage by selectively compressing memory.

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

As databases grow in size and in workload, particular queries or requests may take a substantial amount of time and resources to execute. As such, database administrators may wish to control how memory is used.

SUMMARY

Embodiments of the invention provide a method, system and computer program product for managing the execution of a request by receiving a request that specifies data to be returned. The method, system and computer program product include retrieving the data specified in the query from a first memory location. Also, the method, system and computer program product include identifying indicatory data associated with at least a portion of the data specified in the request wherein the indicatory data is used to determine whether to compress at least a portion of the retrieved data. Finally, the method, system and computer program product include determining whether to compress the portion of the retrieved data based at least in part on the indicatory data and a compression condition, and upon determining to compress the portion of the retrieved data, compressing the corresponding portion of the retrieved data to create compressed data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Some DBMS use data compression to create more space in a particular memory. Freeing additional space in memory by compression then allows additional data to be stored. In turn, this lessens the chance of paging (i.e., fetching data from a secondary storage), which is more time-consuming than compressing and decompressing data. Therefore, efficiently using the limited resources of a primary memory—even if doing so involves compression—will in general reduce the amount of time needed for a given query to execute.

In some cases it may be desirable to selectively compress data in memory. For example, a DBMS may implement a least-recently used (LRU) algorithm to selectively determine what data to compress. In general, this scheme determines what data page stored in memory is used the least and compresses it based on that determination. However, LRU ignores the specific data structures that are actually stored on a data page and the fact that many data structures are known to be used less frequently than others or may be categorized as unimportant. Conversely, some data is too important to compress, and although the DMBS may not be accessing it at a particular moment in time, the DBMS will access that data in the future. In both of these cases, the LRU algorithm produces an inefficient result. In the first case, the data structure will only be compressed after being labeled least-recently used by the operating system though it should have been immediately compressed upon being stored in primary memory by virtue of its data structure. In the second case, compressing data that is known to be heavily accessed, even though it is not currently being accessed, forces the DBMS to subsequently uncompress data which, in turn, slows down a query accessing the data. Embodiments of the present invention provide more efficient methods for determining when to compress data.

Namely, embodiments of the present invention determine what data to compress based on indicatory data associated with a portion of that data. The DBMS compares the indicatory data with certain compression criteria to determine whether the portion of data should be compressed before being stored in the primary memory.

Along with managing the processing time for a given query or set of queries by using compression, embodiments of the present invention provide reporting tools to help a system administrator adjust the amount of data that will be compressed for a given query. The DBMS gathers statistics on the types of queries and the amount of memory compression that occurred during a given query's execution. This information illustrates how the compression criteria may be changed to allow either more or less compression for a given query type. An administrator can then adjust the amount of compression for each query type to further save system resources.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DBMS) or related data available in the cloud. For example, the DBMS could execute on a computing system in the cloud and receive user requests (e.g. queries) to access databases managed by the DBMS. In such a case, the DBMS could selectively compress the data according to its algorithm and store the mixture of compressed and uncompressed data at a storage location in the cloud. Doing so allows a user to access this information from any computing system attached to a network connected to the cloud (e.g., the Internet).

Figure 1A:
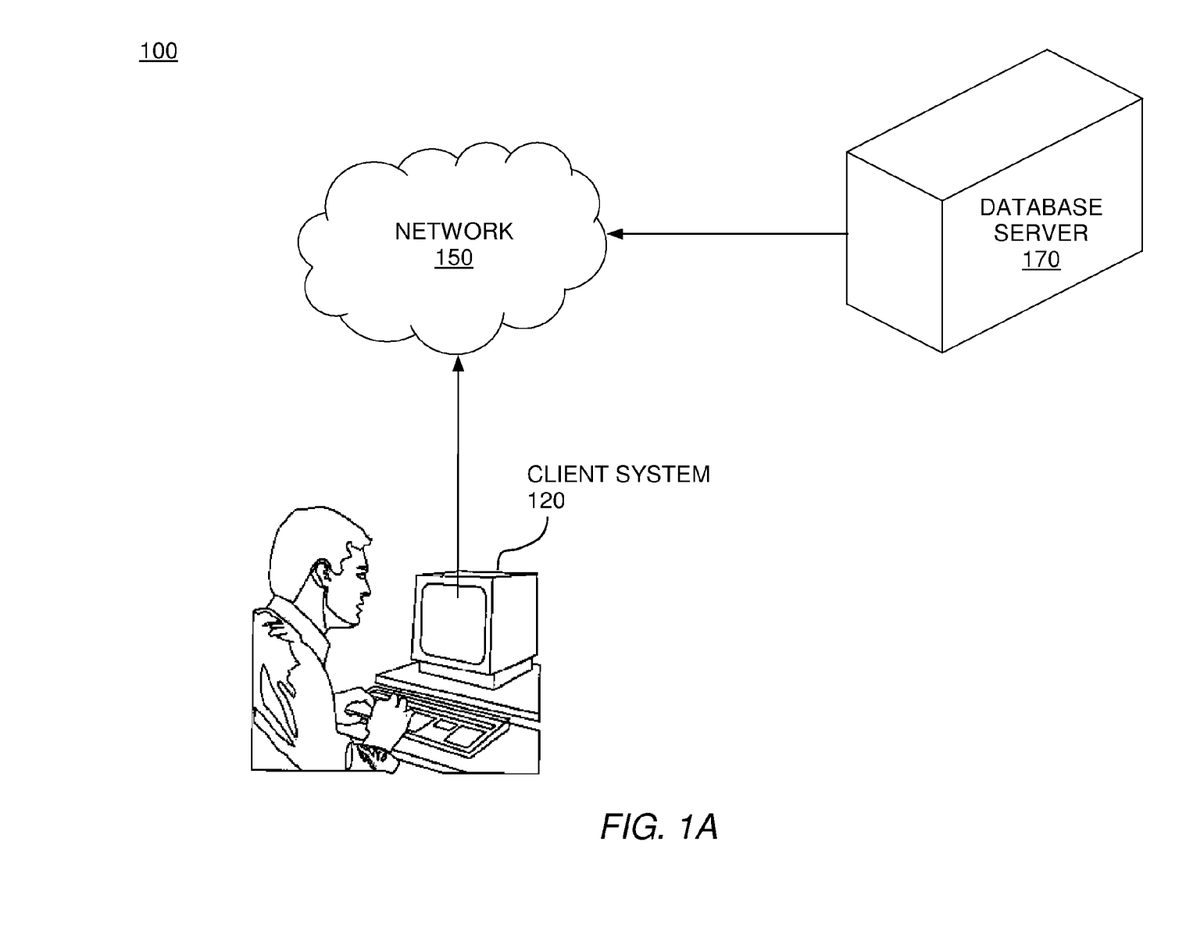
FIG. 1A-1B are block diagrams illustrating a networked system for estimating and compressing data during query processing, according to embodiments of the invention.
Figure 1B:
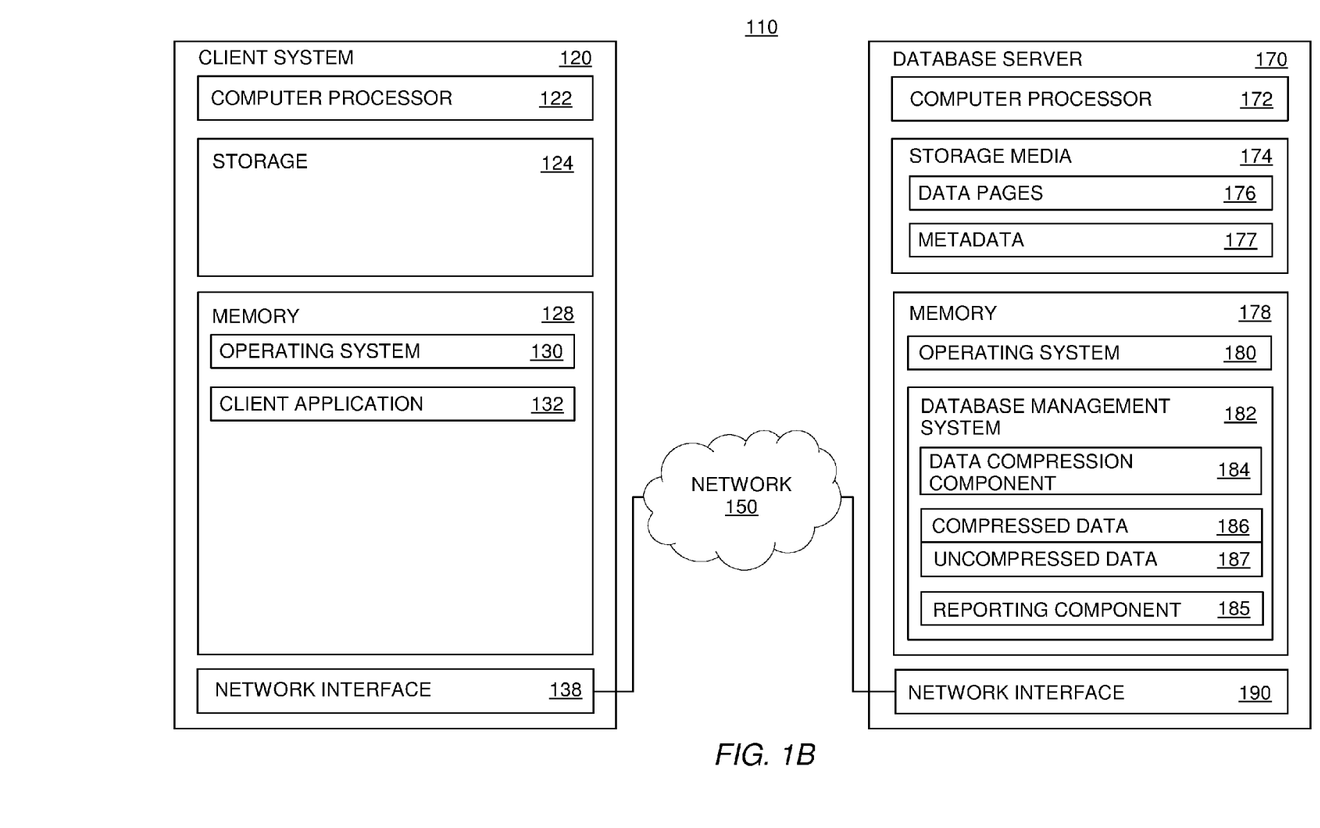

FIG. 1A-1B are block diagrams illustrating a networked system for estimating and managing memory usage for query processing, according to embodiments of the invention. More specifically, FIG. 1A is a block diagram illustrating a networked system for estimating and managing memory usage for query processing. As shown, the system 100 includes a client system 120 and a database server 170, connected by a network 150. Generally, the client system 120 may submit requests (i.e., queries) over the network 150 to a DBMS running on the database server 170. The term "query" denotes a set of commands for retrieving data from a stored database. Queries take the form of a command language, such as the Structured Query Language (SQL), that lets programmers and programs select, insert, update, find out the location of data, and so forth. Generally speaking, any requesting entity (i.e., different query types) can issue queries against data in a database. For example, software applications (such as by an application running on the client system 120), operating systems, and, at the highest level, users may submit queries to the database. These queries may be predefined (i.e., hard coded as part of an application) or may be generated in response to input (e.g., user input). Upon receiving the request, the DBMS on the database server 170 may execute the request on a database specified in the request, and then return the result of the executed request.

In one embodiment, the database server 170 manages the amount of time required to execute a query by implementing a memory compression scheme. For example, the database server 170 may selectively compress memory used by the database server 170 to prevent paging. The term "paging" is a general term to describe how a DBMS may frequently fetch data from a secondary storage, e.g., a hard drive, and place it into memory, e.g., RAM. In one embodiment, the database server 170 selectively chooses data in the memory to compress. Doing so may increase the memory available to the database and permit more data to be stored in the memory, thereby reducing paging to secondary memory storage. For example, assume that when executing a user request for data, a database system initially fetches enough data from secondary storage to fill the primary memory. If the user request encompasses more data, the database system performs a second fetch to the secondary memory storage. Alternatively, the database server 170 can fetch more data from the secondary memory storage during the first fetch by selectively compressing some of the data. Thus, database server 170 may execute the user request without the need of a second fetch operation.

The database compression scheme described above is independent of the method or algorithm used to actually compress the data. Thus, the database server 170 can use any number of data compression algorithms after determining to compress the data. Possible algorithms include: data deduplication, run-length encoding, dictionary coder, Burrows-Wheeler transform, prediction by partial matching, or context mixing. Furthermore, as will be understood by one of ordinary skill in the art, any data compression algorithm capable of performing the functions described herein may be used.

The database server 170 can also collect data about the types of queries performed and the amount of memory compression occurring while executing queries. The database server 170 can then use this data to create a report. An administrator or client accesses this report using the network 150 and a client system 120 or by accessing the database server 170 directly.

FIG. 1B is a block diagram of a networked computer system configured to estimate and manage memory compression for query processing, according to one embodiment of the invention. As shown, the system 110 contains the client system 120 and the database server 170. The client system 120 contains a computer processor 122, storage media 124, memory 128 and a network interface 138. Computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

Illustratively, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating database queries. Once the client application 132 generates a query, the query may be submitted to a DBMS (e.g., DBMS 182) for execution over the network 150. The operating system 130 may be any operating system capable of performing the functions described herein.

The database server 170 contains a computer processor 172, storage media 174, memory 178 and a network interface 190. Computer processor 172 may be any processor capable of performing the functions described herein. Storage media 174 contains data pages 176 and metadata 177. The data pages 176 contain the information requested by a request. Metadata 177 generally refers to data used to describe the definition, structure, or administration of other data. As discussed in greater detail below, either the data pages 176 or the metadata 177 may be used to provide the data compression component 184 with the necessary indicatory data to selectively compress data fetched from storage. The database server 170 may connect to the network 150 using the network interface 190. Furthermore, as will be understood by one of ordinary skill in the art, any computer system capable of performing the functions described herein may be used.

In the pictured embodiment, memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 contains a data compression component 184, compressed data 186, uncompressed data 187, and a reporting component 185. In the present embodiment, the data compression component 184 uses the information found in either the data pages 176, the metadata 177, or the query type to determine whether to compress the retrieved data into compressed data 186 or leave it as uncompressed data 187 upon storing it into the memory 178. The operating system 180 may be any operating system capable of performing the functions described herein.

The reporting component 185 records, compiles, and outputs statistics related to the compression process. In general, the data compression component 184 associates data with the request or query type, i.e., a query made by a user, job, application, or other DBMS. Further, the reporting component 185 generates reports specifying the types of requests and the amount of compression associated with each request. Moreover, the data compression component 184 can also determine what types of data (i.e., a table or a particular column within a table) are frequently compressed and accessed when executing a request. This information can also be sent to the reporting component 185 and used in a report to an administrator. Finally, the reporting component 185 can submit reports on demand or according to a regular schedule.

Generally, the client application 132 may generate and submit queries to the DBMS 182 using the network 150. In one embodiment, once the DBMS 182 receives a query, the DBMS 182 fetches data from the storage media 174 and stores the retrieved data in the memory 178 as either compressed data 186 or uncompressed data 187. The data compression component 184 determines whether to compress retrieved data based on information within the data pages 176, by associated metadata 177, the query type, or any combination thereof. These factors are generally referred to as indicatory data. Specifically, indicatory data can be values within a range, keys, frequency of access, or dates updated/entered. For example, a user request for data may include a tertiary table—i.e., data that is needed to execute a query but seldom accessed—which can be compressed. The data compression component 184 may read the metadata 177 associated with the table and store the table in memory 178 as compressed data 184. Furthermore, the indicatory data can be obtained by the query type. For example, a query initiated by a certain user ID can be the indicatory data to determine the amount of compression performed.

Figure 2:
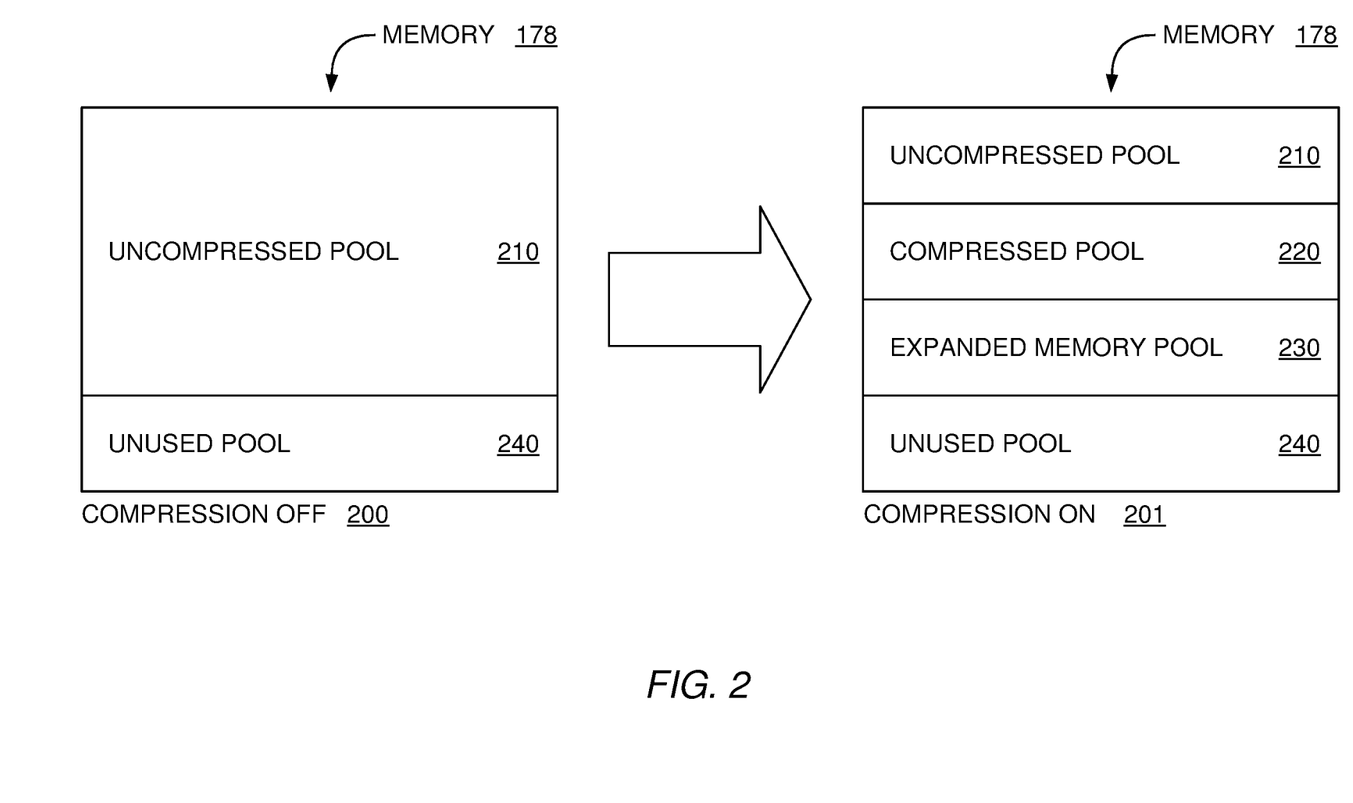
FIG. 2 is a block diagram illustrating the effect of memory compression, according to one embodiment of the invention.

FIG. 2 provides a graphical representation of the effect of the database server 170 found in FIG. 1B on the memory 178, according to one embodiment of the invention. Note that the memory 178 has the same data storage capacity when the memory compression is turned off 200 and when the memory compression is turned on 201. With the compression turned off 200, the memory 178 contains two pools. The uncompressed pool 210 stores data that has not been compressed, while the unused pool 240 represents the unused data capacity of the memory 178. After compression is turned on 201, the compressed pool 220 appears. Also note that although FIG. 2 shows the various pools as being contiguous, in practice, memory regions allocated to a pool may be fragmented. One of ordinary skill in the art will recognize, however, that the portion of the memory 178 occupied by a pool is significant. A smaller uncompressed pool 210 after compression is turned on 201 relates to a smaller percentage of memory 178 occupied by the uncompressed pool 210. Accordingly, data once located in the uncompressed pool 210 has been compressed and put into the compressed pool 220. The leftover capacity is labeled as the expanded memory pool 230, while the unused pool 240 remains unchanged.

After compression is turned on, the expanded memory pool 230 is now available to store more data, either compressed or uncompressed. A DBMS can use the expanded memory pool 230 to store additional data during fetches to a storage media 174. This memory compression expands available memory and reduces paging.

Figure 3A:
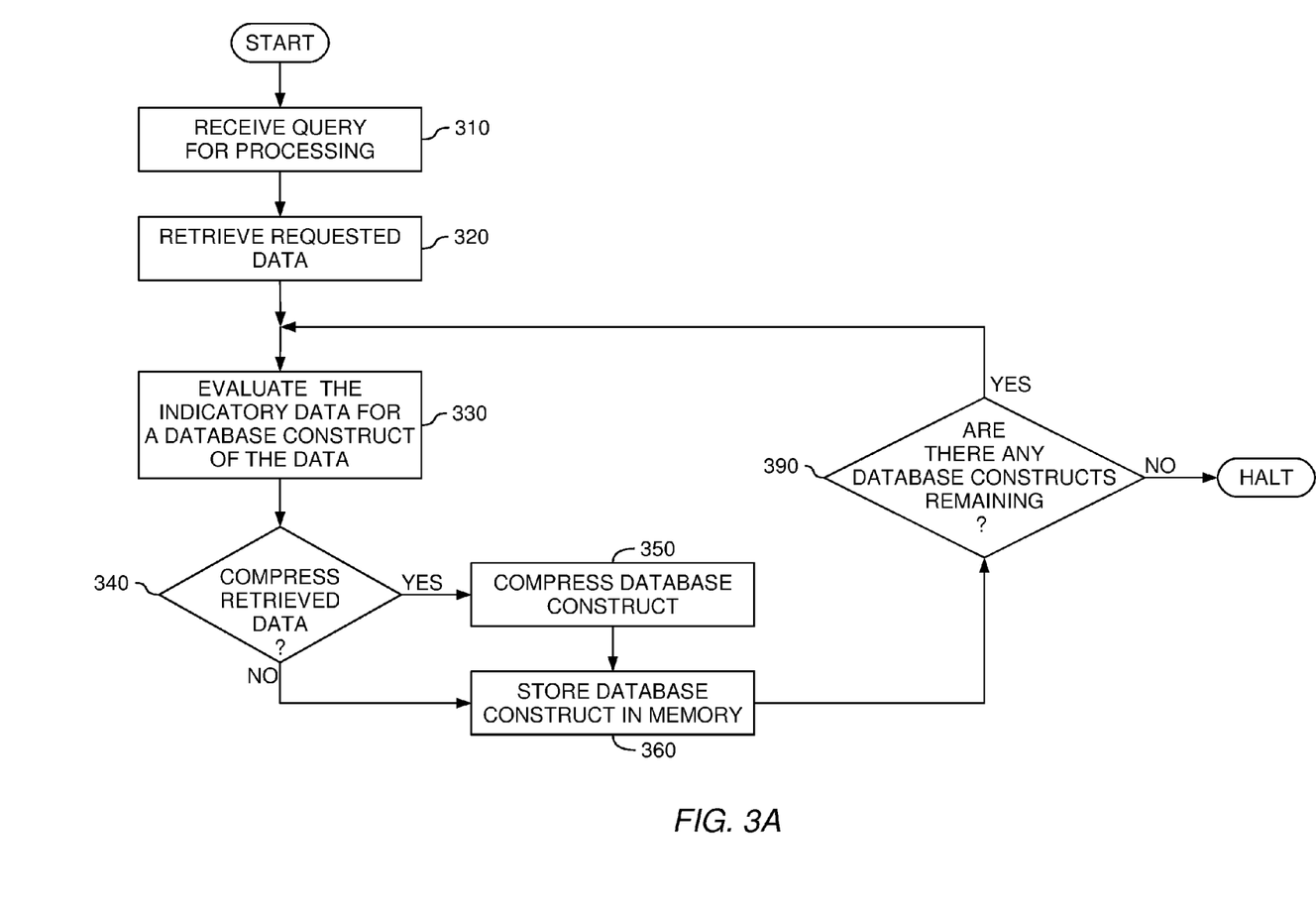
FIG. 3A-3B are flow diagrams illustrating methods of managing query execution, according to embodiments of the invention.

FIG. 3A is a flowchart illustrating a method of managing memory compression according to one embodiment of the invention. In general, the database compression component 184 identifies at least one database construct found within the retrieved data pages 176, associates indicatory data with the database construct, and determines whether to compress the construct based on the indicatory data. As shown, the method starts at step 310 after the database server 170 receives a query. As noted above, such a query can originate from a client system 120. Alternatively, the query can come from an administrator, an application, or another DBMS. At step 320, the database server 170 uses the request to determine what data to retrieve. The DBMS 182 then issues a fetch request 320 to obtain the data pages 176 from the storage media 174. After the fetch, the data compression component 184 processes the retrieved data pages 176. At step 330, the data compression component 184 arranges a portion of a received data page 176 or multiple received data pages 176 (or some combination of the two) into an abstract database construct. One of ordinary skill in the art will recognize using abstract database constructs is only one way to read and process data retrieved from storage media, e.g., a disk. Nonetheless, this database construct may be any combination of retrieved data, including, e.g., a complete table (or tables) or portions of a table, such as rows, columns, or records. For example, the data compression component 184 could combine a column in one table with a row in a different table to form a database construct. Moreover, a database construct may have multiple levels—i.e., a database construct stored within another database construct. For example, a table is one database construct while a row in that table is another.

In one embodiment, the data compression component 184 parses through the retrieved data pages 176 to find database constructs with associated metadata 177. For example, a table may have metadata that then can be used as indicatory data. In such a case, the data compression component 184 ascertains whether to compress the entire table based on the metadata 177. In another embodiment, an Extensible Markup language (XML) document could be used to determine whether a row, column, or entry should be compressed when stored in memory 178. In addition, both a column in a table and the table itself may have specific metadata 177 that the data compression component 184 can evaluate independently to determine whether the two separate database constructs should be compressed. In another example, a column in one table may have the same associated metadata 177 as a row in a separate table, which the data compression component 184 can then use to simultaneously decide whether to compress both the row and column. Finally, the data compression component 184 may also compress the metadata 177 along with the corresponding database construct.

As an alternative to using metadata 177 as the indicatory data, the data pages 176 themselves may provide the indicatory data used to determine whether to compress the database constructs. For example, if each employee is assigned a unique employee ID stored in a row of a table that also includes additional information about an employee, e.g., home address, work phone, or years of experience, then, while responding to a query to retrieve employee information, the data compression component 184 can use the employee IDs as indicatory data to determine whether to compress the entire row. Similarly, if all tertiary tables begin with a certain code, then the data compression component 184 may use that code to determine whether to compress the entire table.

In another embodiment, the query or request type may be used as the indicatory data. As mentioned above, each query may be associated with a query type. For example, the data fetched while executing a query requested by a senior engineer may compress data differently than a query requested by an intern. In addition to using the user as the indicatory data, the database compression component 184 may determine the amount of compression applied to the query results based on job and subsystem requests. Job and subsystem requests do not necessarily originate from the client system 120. Instead, such requests could originate from other components within the database server 170. Similar to the types of user queries, some types of job and subsystem requests may be more critical than others. In sum, an inexhaustive list of query or request types includes: queries done by users, jobs, a group, a system, a subsystem, applications, and other databases. Of course, the examples above are merely for illustrative purposes, and one of ordinary skill in the art will recognize that other indicatory data besides metadata 177, data found within the data pages 176, and query types may be used as well.

After at least one database construct with associated indicatory data has been identified, at step 330 the data compression component 184 evaluates the indicatory data to determine whether the associated database construct should be compressed. As mentioned, the indicatory data may be metadata 177, information from the data pages 176 themselves, or the query type. Once the indicatory data has been evaluated, the data compression component 184 determines whether to compress the associated database construct. In one embodiment, the data compression component 184 uses a compression condition to determine whether to compress a given database structure. Specifically, the data compression component 184 may compare the indicatory data (which can be values within a range, keys, frequency of access, or dates updated/entered) to a corresponding compression condition. In other words, for each type of indicatory data the data compression component 184 will have a corresponding compression condition. Though the corresponding compression conditions will vary according to the type of indicatory data, these variations will all be referred to herein as compression conditions. The compression conditions can be, but are not limited to, numbers, alphabetic letters, flags, ranges, tables, or indexes. In general, the data compression component 184 compares the indicatory data associated with a database construct to a corresponding compression condition. If the data compression component 184 decides to compress the construct, the database construct is compressed and put into the compressed data 186 of the memory 178. If not, the construct is placed into memory 178 without compression.

A compression condition can be dynamic, static, or some combination of both. For example, the database compression component 184 may use a specific value as the compression condition for one query type but use a different value when executing a second query type, even if the two queries request the same data. This could occur if the two queries are received from different client systems 120, e.g., a manager versus a non-manager. Thus, two queries requesting the same data may use different amounts of compression when executed. Moreover, the compression conditions need not operate independently of each other. If metadata 177 provides two types of indicatory data—e.g., a key and a date updated—the data compression component 184 can evaluate each and decide what action to take. For example, the data compression component 184 may assign weights to different compression conditions and use the weights to decide which indicatory data takes precedence in the case of a conflict. Alternatively, the data compression component 184 may have a compression condition that is a combination of a key and date updated, such as a look-up table. Additionally, the weight given to a particular compression condition or to a query type can be changed, i.e., the compression condition is dynamic. As described below, doing so may be useful when using the reporting component 185 of the DBMS 182. Alternatively, a client system 120 could submit a query that temporarily overrides the default compression conditions normally assigned for that type of query. For example, if a user knows that a query will repeatedly use tables that the data compression component 184 normally compresses, she can adjust the compression conditions to limit that compression, or stop it altogether.

In one embodiment, the compression condition provides a range of values. For example, if the metadata is a single number, the database compression component 184 could compare that number to the range of values. If the value is within the range, the associated database construct is compressed. Otherwise, the database compression component 184 stores the construct without first compressing the data. Obviously, the database compression component 184 could reverse this method and compress data if the metadata fell outside the range.

Alternatively, instead of metadata, information in the data pages themselves could be used as the value, for example, an employee's years of experience. In such a case, this value may also be compared to a range, i.e., the compression condition. Base on whether the value is within the range, the database compression component 184 determines to compress the corresponding database construct.

In another embodiment, the compression condition is a key. The database compression component 184 compares the indicatory data with the key to determine a match. If a match is found, the data compression component 184 compresses the corresponding database construct. For example, a query may demand personal information for specific employees. Many of the data pages 176 fetched from storage media 174 responsive to the request may contain employee information that the requesting client system 120 will not want. If a company assigns to managers and executives a unique employee ID that always contains a leading nine, this could be used as indicatory data. In such a case, the data compression system 184 could set the compression condition to a nine for this type of query. Assuming that manager and executive data is accessed more frequently than other employees, those records that have a unique ID beginning with a nine should not be compressed. Thus, the data compression component 184 does not compress the construct that has indicatory data that matches the key, i.e., the compression condition. More specifically, all tertiary tables may be labeled by the same metadata that is different than all other database constructs. When a data compression component 184 identifies this code, a comparison with the compression condition, i.e. the unique code, would then inform the data compression component 184 to compress the table.

In another embodiment, the compression condition corresponds to a frequency at which the construct is accessed. Many database constructs use metadata 177 to record when the data was last accessed. In such a case, the indicatory data may be composed from a combination of metadata and historical data. The data compression component 184 accesses this specific metadata and compares it to a compression condition. For example, assuming a recently accessed table is likely to be accessed again, the database compression component 184 could set the compression condition so that data that has not been accessed within the hour (or other specified time period) is not compressed.

In another embodiment, the date of creation or the date the data was updated is used as the indicatory data. For example, the data compression component 184 may not compress constructs created within the past week based on the assumption that recently created database constructs are accessed more frequently, and thus, should not be compressed when fetched from the storage media 174. Note that the previous two examples illustrate how two separate compression conditions may interact. For example, metadata could contain both a last accessed value—i.e., the frequency of access—and a date of creation. In order to determine whether to compress a database construct which has multiple types of indicatory data, the data compression component 184 may always ignore one type of indicatory data, ignore both and look for additional indicatory data, or assign weights to determine which to follow. For example, a weighting formula may include compressing the construct only if the database construct was created within the past three days but has not been accessed within the previous two days.

Further, when a second construct is found within a first construct, the data compression component 184 may evaluate the two cumulatively or separately. In the first embodiment, the data compression component 184 may only look at the indicatory data of the first construct and compress all the data without regard of any embedded constructs. In the second embodiment, if the data compression component 184 determines to compress the entire construct, it will first parse through the entire table to locate any other constructs. If other constructs are found, the data compression component 184 can exclude the construct from compression and analyze the construct separately.

In another embodiment, the compression condition is based on historical data or a pattern determined by the use of a hash table, sort buffer, temporary index, or other similar data structure that maps identifying values. During normal operation, a DBMS 182 uses these indexes as keys to locate and store in memory the corresponding data, i.e., value. However, they also may be used to inform the data compression component 184 what data may be accessed next. For example, if multiple queries use a hash table either sequentially (or by some other recognizable pattern), the database compression component 184 may recognize this historical data and set the compression condition accordingly. If a series of queries have been looking up data that is mapped sequentially by the temporary index, then the compression condition informs the database compression component 184 not to compress the data that is mapped next. Alternatively, if the queries progress through an index skipping every two entries, the data compression component 184 may compress the data of the skipped entries.

Once the data compression component 184 compares the indicatory data to a corresponding compression condition, the process moves to step 340. If the result of the previous step 330 is to compress the database construct, the data compression component 184 then compresses the data 350. If the result is to not compress, the construct is stored 360 in memory 178 as uncompressed data 187. If data compression component 184 decided to compress the construct at step 350, then at step 360 the data compression component 184 stores the compressed data in memory 178.

Because a database construct may be created from only a portion of a retrieved data page 176, in many instances the construct may only be a small part of the requested data. Accordingly, at step 390, the data compression component 184 determines if all the retrieved data pages 176 and metadata 177 have been parsed. If so, the process ends. Otherwise, the process returns to step 330 to determine whether another database construct is found among the retrieved data pages 176. Although step 320 of FIG. 3A shows that the DBMS 182 retrieves all of the data before the data compression component 184 begins to evaluate the indicatory data, one of ordinary skill in the art will understand the data compression component 184 may evaluate the data while the DBMS 182 is still retrieving data pages 176.

Figure 3B:
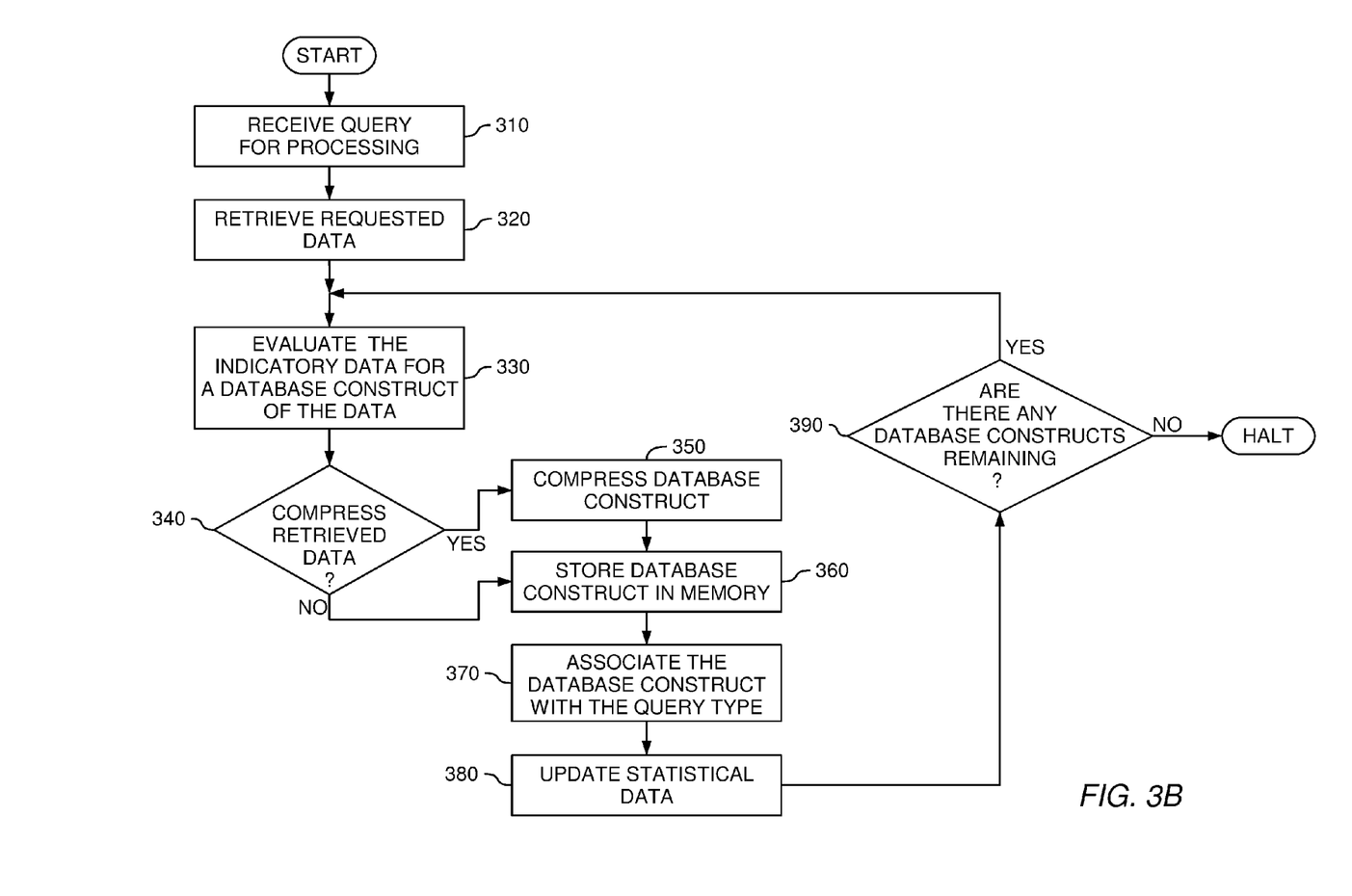

FIG. 3B is the same as FIG. 3A except for added steps 370 and 380. In step 370 the data compression component 184 creates a statistical record associated with each database construct. One example includes a record of whether the database construct was compressed and what type of query was used to retrieve the construct from the storage media 174. With this information, an administrator may determine how much compression occurs with each query or request type.

In another embodiment, the data compression component 184 may collect additional information such as the types of data construct being compressed. Thus, if certain types of tables are unnecessary during the execution of a query, the data compression component 184 can be configured to record whether that table was identified as a construct and compressed. As discussed above, the data compression component 184 may also be configured to record whether a compression condition that corresponds to multiple indicatory data—e.g., frequency of access and date created—should be adjusted to create a more efficient compression ratio. Similarly, the record compiled by the reporting component 185 could indicate to an administrator whether to independently evaluate a second construct found within a first construct.

At step 380, the data compression component 184 sends the statistical record to the reporting component 185. The reporting component 185 can then update the statistics using the record. The reporting component can compare query types, database constructs, the execution time of the requests, and conflicts between indicatory data to create a report suggesting changes to the compression conditions. For example, if a database construct has two types of associated indicatory data, the administrator may alter the corresponding compression condition to ignore one type of the indicatory data. The report may also include an estimated time for each request assuming no uncompression or compression was needed. Alternatively, the administrator may use the report to instruct the database compression component 184 to evaluate additional types of indicatory data. For example, even if a type of table is known to be accessed only once during a certain type of a query, it still needs to be brought into the memory 178. However, if the reporting component 185 does not include that table in the report detailing the types of constructs that were compressed, the administrator should realize the data compression component 184 needs to be adjusted to recognize the indicatory data associated with the unnecessary table. Thus, when the query is executed again, the data compression component 184 should compress the infrequently used table. Therefore, even an omission in the record created by the reporting component 185 informs the administrator how to further optimize the data compression component 184.

Figure 4:
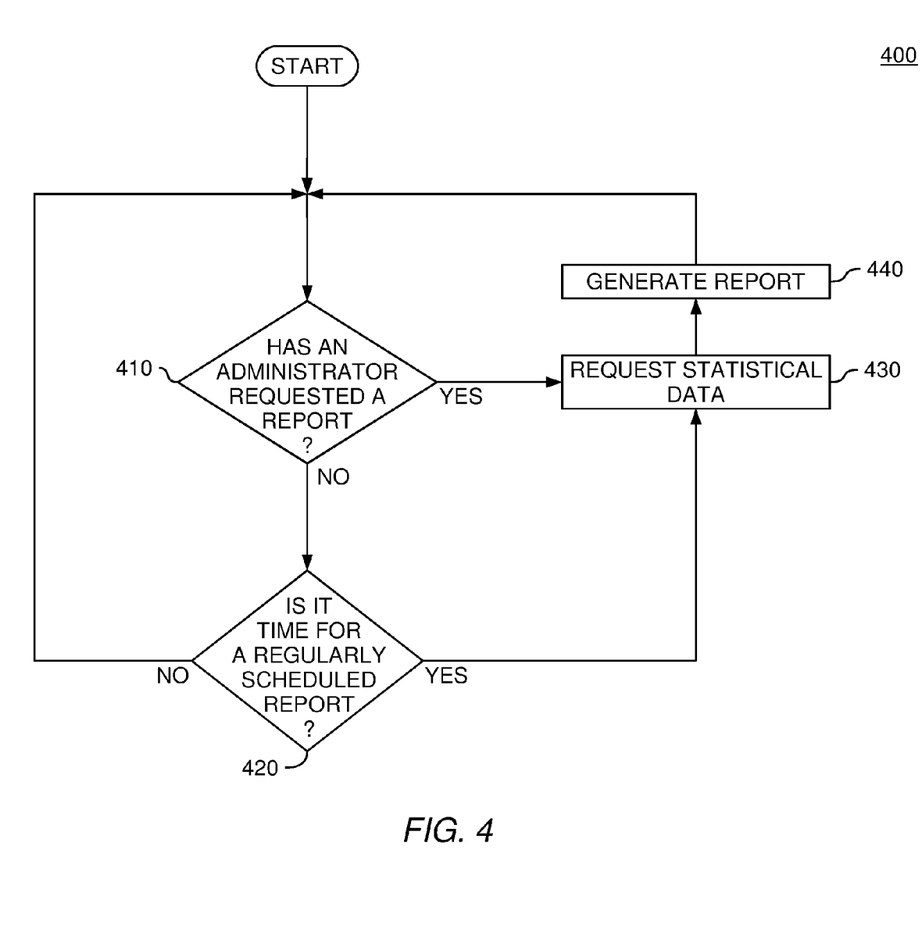
FIG. 4 is a flow diagram illustrating a method of managing query execution, according to one embodiment of the invention.

FIG. 4 illustrates a method 400 for generating generates a statistical report, according to one embodiment of the invention. The method 400 may operate relatively continuously while the database server 170 is operating or scheduled to run at specific times. At step 410, the compression system 170 determines whether an administrator has requested a report. If not, at step 420, the compression system 170 determines whether the operating system 180 has requested a report, which is based on a pre-set schedule. If neither the administrator nor the operating system 180 requests a report, the process loops back to step 410 to repeat. Once a request for a report occurs 430, the DBMS 182 signals the reporting component 185 which has been updated as discussed above with reference to FIG. 3B.

At step 440, the reporting component 185 generates a report. The report is generated based on either input from the administrator or by the conditions provided by the operating system 180. Accordingly, a report requested from the operating system 180 during a regularly scheduled time may differ from a report requested by an administrator. For example, the administrator may need less or more data, such as ignoring certain database construct and/or query types. The reporting component can then generate a report based on any combination of inputs discussed above.

While completing step 440, the reporting component 185 continues to update the statistical data using the information received from the data compression component 184. In other words, data may still be compressed while the reporting component 185 generates a report.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing data in memory, comprising:
   receiving, from a client, a request specifying data to be returned from a database;
   retrieving, by operation of one or more computer processors, the data specified in the request from a first memory storage element in the database;
   identifying indicatory data associated with at least a portion of the data specified in the request, wherein the indicatory data is used to determine whether to compress at least a portion of the retrieved data;
   in response to the request, determining whether to compress the portion of the retrieved data based at least in part on the indicatory data and a compression condition;
   upon determining to compress the portion of the retrieved data in response to the request, compressing the portion of the retrieved data to create compressed data;
   storing, in response to the request to return data from the database, the compressed data in a second memory storage element in the database, wherein the second memory storage element is different from the first memory storage element;
   storing an uncompressed portion of the retrieved data in the second memory storage element;
   determining a subset of the retrieved data required to satisfy the request by evaluating the uncompressed and compressed portions stored in the second memory storage element;
     upon determining the subset of the retrieved data comprises data from the compressed portion:
       uncompressing the data from the compressed portion; and
       transmitting the subset of the retrieved data to satisfy the request;
   determining a request type based on the request from a plurality of request types;
   creating a record for the compressed data, wherein the record stores the request type associated with the compressed data and a flag indicating that the compressed data was compressed;
   sending the record to a reporting component;
   generating a report based on at least one record;
   outputting the report; and
   after outputting the report, receiving a modification to the compression condition, wherein the compression condition is compared to the indicatory data to determine whether the portion of the retrieved data is compressed.

2. The method of claim 1, wherein the portion of the retrieved data includes at least one database construct, the database construct comprising at least one of: a database table row, a database table column, a database table record, a database table, and combinations thereof.

3. The method of claim 2, wherein the indicatory data is associated with the database construct.

4. The method of claim 1, wherein the indicatory data comprises at least one of: a flag, a key, a value within a range, a date, and combinations thereof.

5. The method of claim 1, wherein the first memory storage element is a secondary storage device of the database, and the second memory storage element is a primary memory element of the database.

6. A computer program product for managing data in memory, the computer program product comprising:
   a non-transitory computer-readable storage medium having computer-readable program code embodied therewith, the computer-readable program code comprising:
   computer-readable program code configured to:
     receive, from a client, a request specifying data to be returned from a database;
     retrieve the data specified in the request from a first memory storage element in the database;
     identify indicatory data associated with at least a portion of the data specified in the request, wherein the indicatory data is used to determine whether to compress at least a portion of the retrieved data;
     in response to the request, determine whether to compress the portion of the retrieved data based at least in part on the indicatory data and a compression condition;
     upon determining to compress the portion of the retrieved data in response to the request, compress the portion of the retrieved data to create compressed data;
     store, in response to the request to return data from the database, the compressed data in a second memory storage element in the database, wherein the second memory storage element is different from the first memory storage element;
     store an uncompressed portion of the retrieved data in the second memory storage element;
     determine a subset of the retrieved data required to satisfy the request by evaluating the uncompressed and compressed portions stored in the second memory storage element;
       upon determining the subset of the retrieved data comprises data from the compressed portion:
       uncompress the data from the compressed portion, and
       transmit the subset of the retrieved data to satisfy the request;
     determine a request type based on the request from a plurality of request types;
     create a record for the compressed data, wherein the record stores the request type associated with the compressed data and a flag indicating that the compressed data was compressed;

send the record to a reporting component;
generate a report based on at least one record;
output the report; and
after outputting the report, receive a modification to the compression condition, wherein the compression condition is compared to the indicatory data to determine whether the portion of the retrieved data is compressed.

7. The computer-readable storage medium of claim 6, wherein the portion of the retrieved data includes at least one database construct, the database construct comprising at least one of: a database table row, a database table column, a database table record, a database table, and combinations thereof.

8. The computer-readable storage medium of claim 7, wherein the indicatory data is associated with the database construct.

9. The computer-readable storage medium of claim 6, wherein the indicatory data comprises at least one of: a flag, a key, a value within a range, a date, and combinations thereof.

10. The computer-readable storage medium of claim 6, wherein the first memory storage element is a secondary storage device of the database, and the second memory storage element is a primary memory element of the database.

11. A system, comprising:
a computer processor; and
a memory containing a program that, when executed on the computer processor, performs an operation for managing the execution of a query, comprising:
receiving, from a client, a request specifying data to be returned from a database;
retrieving the data specified in the request from a first memory storage element in the database;
identifying indicatory data associated with at least a portion of the data specified in the request, wherein the indicatory data is used to determine whether to compress at least a portion of the retrieved data;
in response to the request, determining whether to compress the portion of the retrieved data based at least in part on the indicatory data and a compression condition;
upon determining to compress the portion of the retrieved data in response to the request, compressing the portion of the retrieved data to create compressed data;
storing, in response to the request to return data from the database, the compressed data in a second memory storage element in the database, wherein the second memory storage element is different from the first memory storage element
storing an uncompressed portion of the retrieved data in the second memory storage element;
determining a subset of the retrieved data required to satisfy the request by evaluating the uncompressed and compressed portions stored in the second memory storage element; and
upon determining the subset of the retrieved data comprises data from the compressed portion:
uncompressing the data from the compressed portion, and
transmitting the subset of the retrieved data to satisfy the request;
determining a request type based on the request from a plurality of request types;
creating a record for the compressed data, wherein the record stores the request type associated with the compressed data and a flag indicating that the compressed data was compressed;
sending the record to a reporting component;
generating a report based on at least one record;
outputting the report; and
after outputting the report, receiving a modification to the compression condition, wherein the compression condition is compared to the indicatory data to determine whether the portion of the retrieved data is compressed.

12. The system of claim 11, wherein the portion of the retrieved data includes at least one database construct, the database construct comprising at least one of: a database table row, a database table column, a database table record, a database table, and combinations thereof.

13. The system of claim 12, wherein the indicatory data is associated with the database construct.

14. The system of claim 11, wherein the first memory storage element is a secondary storage device of the database, and the second memory storage element is a primary memory element of the database.

* * * * *